U. D. LEEPER.
NUT LOCK.
APPLICATION FILED MAR. 15, 1918.

1,283,532.

Patented Nov. 5, 1918.

WITNESSES
W. E. Fielding
Ross J. Woodward

INVENTOR
Upton D. Leeper
BY Richard Bowen
ATTORNEY

UNITED STATES PATENT OFFICE.

UPTON D. LEEPER, OF BARNESVILLE, OHIO.

NUT-LOCK.

1,283,532.

Specification of Letters Patent.

Patented Nov. 5, 1918.

Application filed March 15, 1918. Serial No. 222,676.

*To all whom it may concern:*

Be it known that I, UPTON D. LEEPER, a citizen of the United States, residing at Barnesville, in the county of Belmont and State of Ohio, have invented certain new and useful Improvements in Nut-Locks, of which the following is a specification.

This invention relates to an improved nut lock of the resilient washer type and the principal object of the invention is to provide a nut lock which may be formed from a strip of resilient material and which will be so constructed that it will include nut engaging teeth for holding the nut against rotation and which will further be so constructed that it will create a binding action between the threads of the bolt and nut and permit of expansion under heat and contraction under cold without the binding action being interfered with.

Another object of the invention is to provide a nut lock of the spring metal type which will be simple in construction but very efficient in operation.

This invention is illustrated in the accompanying drawings, wherein:—

Figure 1:
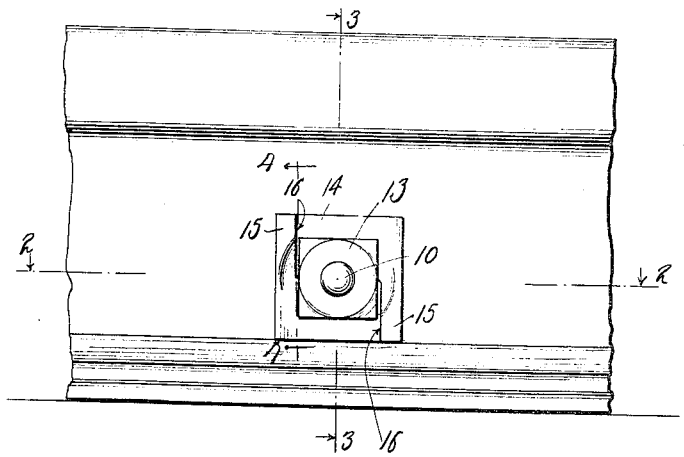
Figure 1 is a side elevation showing the improved nut lock in use.
Figure 2:
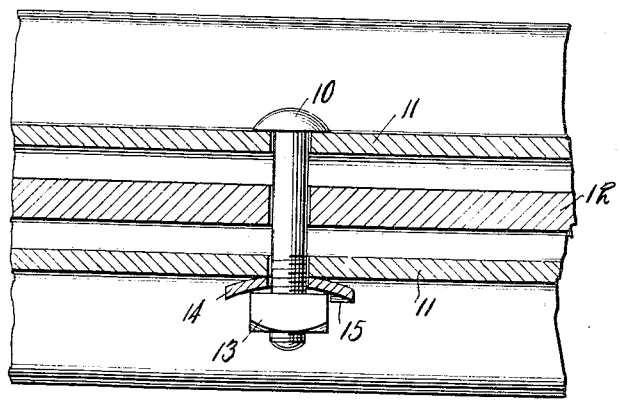
Fig. 2 is a longitudinal sectional view taken along the line 2—2 of Fig. 1 with the bolt and nut shown in top plan.
Figure 4:
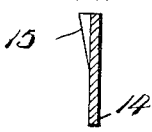
Fig. 4 is a sectional view of the washer taken on the line 4—4 of Fig. 1.
Figure 3:
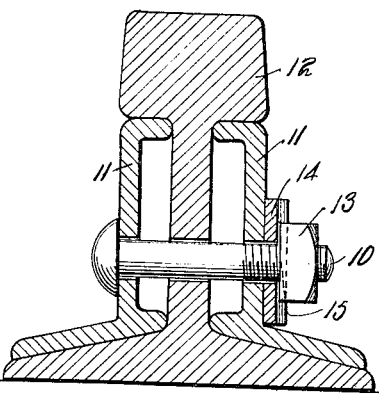
Fig. 3 is a vertical sectional view taken along the line 3—3 of Fig. 1 with the bolt and nut in elevation.

The bolt 10 is of the type used for holding fish plates 11 in engagement with the web of a rail 12 and upon this bolt 10 there will be screwed the nut 13 which nut will be securely held in place by the improved nut lock or washer 14. This locking washer 14 is formed of resilient metal and will be curved as shown in Figs. 2 and 3 so that the washer will engage the inner face of the nut and have a tendency to move the nut toward the free end of the bolt thus creating a binding action between the threads of the bolt and nut. As this washer is curved to extend from the fish plates 11, expansion and contraction under the action of heat and cold will be permitted without the binding action between the threads of the bolt and nut being lost. The corner portions of the locking washer are thickened to provide teeth 15 which merge into the outer face of the locking washer thus permitting the nut to ride easily upon the teeth when turned to tighten the nut. These teeth are however formed to provide shoulders 16 which will engage the nut and prevent the nut from turning in the opposite direction. As this plate is rectangular and of substantially the same height as the web of the rail, these plates will fit between the base and the tread of the rails and will be held against turning. It will thus be seen that with this structure, the nut will be held against turning both by the binding action between the threads of the bolt and nut and also by the positive side locks of the teeth. It will be obvious, that if desired similar teeth could be provided at the two remaining corner portions of the locking washer.

What is claimed is:—

1. A lock washer having opposite side edges thereof gradually thickened for a portion of their length to provide inclined locking ribs extending from one face of the washer for locking engagement with a nut.

2. A lock washer having opposite side edges thereof gradually thickened for a portion of their length to provide inclined oppositely directed locking ribs projecting from one face of the washer for locking engagement with a nut, said ribs having their outer ends flush with opposite margins of the washer and gradually decreasing in thickness to a point intermediate said margins.

In testimony whereof I affix my signature in presence of two witnesses.

UPTON D. LEEPER.

Witnesses:
 OLIVER GOODNIGHT,
 C. C. COWGILL.